Sept. 7, 1937. A. BRUNNER 2,092,105
TEMPERATURE CONTROLLED CONTAINER FOR REFRIGERATORS
Original Filed May 4, 1935
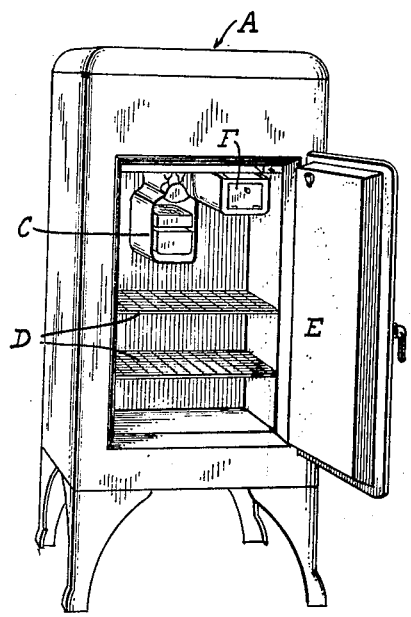
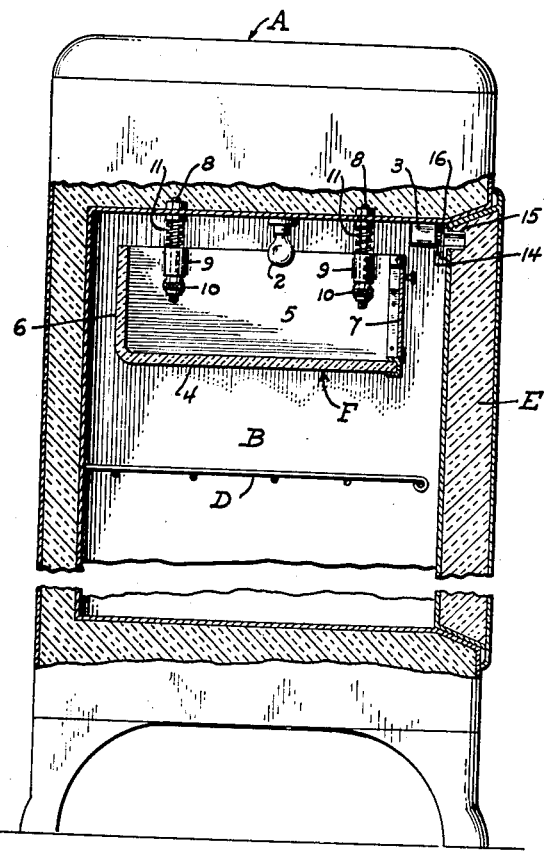
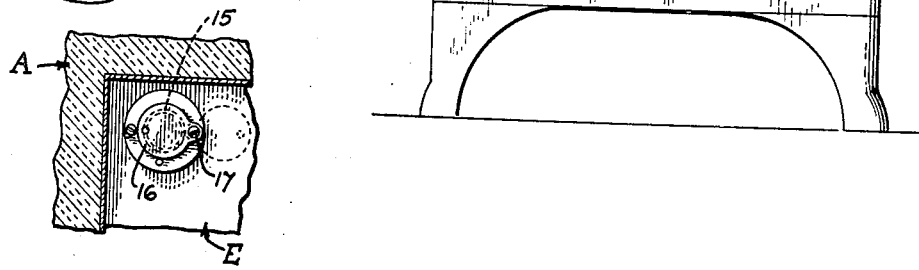
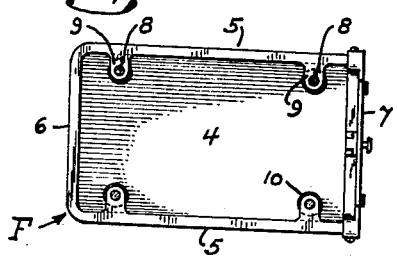
INVENTOR.
Arthur Brunner,
BY
Chas. E. Townsend.
ATTORNEY.

Patented Sept. 7, 1937

2,092,105

UNITED STATES PATENT OFFICE 2,092,105

TEMPERATURE CONTROLLED CONTAINER FOR REFRIGERATORS

Arthur Brunner, San Francisco, Calif.

Application May 4, 1935, Serial No. 19,863
Renewed March 8, 1937

5 Claims. (Cl. 257—9)

This invention relates to refrigerators and especially to means for maintaining certain commodities placed in the refrigerator at a higher temperature than other commodities.

Household or domestic refrigerators, whether mechanically or chemically cooled, or otherwise operated are exceptionally proficient when it comes to the preservation of foods and other commodities but they have one objection, to-wit, that of maintaining certain foods or commodities entirely too cool. For instance, milk when kept in a refrigerator becomes so cool that it can not be given to babies and younger children and as such must be partially heated before ready for use. Similarly, butter becomes so hard that it will not spread and as such must be placed on top or adjacent the kitchen stove, or some other heating medium, before it is ready for use. These warming operations often result in waste. For instance, the butter is often forgotten and is completely melted, warming of the milk often results in overheating, possibly burning, and so on. It takes the mother's or the servant's time and is generally a nuisance which can be entirely eliminated.

The object of the present invention is to generally improve the operation of refrigerators of the character described, and in particular to provide a compartment or container within the main cooling chamber of a refrigerator which may be maintained at a temperature sufficiently high to prevent milk from becoming excessively cool, butter from becoming too hard, etc.

The invention, more specifically stated, consists in providing a special container or receptacle within the main cooling chamber of a refrigerator, which is adapted for the reception of milk, butter, and other commodities; to provide means for heating the container, preferably by an incandescent bulb, an electric resistance heating element, or other means; and, further, to provide means where electric heating is employed for making and breaking the circuit therethrough and for controlling said circuit.

The invention is shown by way of illustration in the accompanying drawing, in which—

Fig. 1 is a perspective view of the standard form of refrigerator, showing the receptacle applied thereto;

Fig. 2 is a side elevation partially in section;

Fig. 3 is a sectional view showing the switch controlling plate;

Fig. 4 is a plan view of the special container.

Referring to the drawing in detail, and particularly Figs. 1 and 2, A indicates in general a standard type of household refrigerator, B the main cooling chamber formed therein, C the compartment in which the ice cubes are frozen, D the shelves or trays provided for the reception of the various foods or commodities to be kept, and E the door whereby access is had to the main cooling compartment.

Most modern refrigerators are also provided with a ceiling light, such as shown at 2, and a switch 3 which is actuated by the opening and closing of the door; the switch being so arranged that opening of the door closes the circuit, or in other words turns on the light. Closing of the door breaks the circuit or extinguishes the light. The light is of the incandescent bulb type and is, in the present instance, utilized not only for lighting the interior of the refrigerator when the door is opened but also for heating purposes as will hereinafter appear.

Suitably arranged adjacent the ceiling is a container or receptacle generally indicated at F. This container is placed directly below the light bulb 2 and is preferably made of glass or a similar transparent, or at least semi-transparent, material to afford as little obstruction to the admission of light rays as possible. The container has a bottom section 4, sides 5—5, and end sections 6, and a hinged door 7 at the opposite end.

The upper side of the container is open and spaced from the ceiling as clearly shown in Fig. 2. Any suitable means may be employed for supporting the container with relation to the ceiling, the means here shown being a plurality of bolts 8 secured to the ceiling and extending through lugs 9 formed on the inner side walls of the container. The lower ends of the bolts are terminated to receive nuts 10 which engage the lower faces of the lugs. Springs 11 are interposed between the upper faces of the lugs and the ceiling and by adjusting the nuts the space between the upper open end of the container and the ceiling may be varied.

The switch whereby the circuit through the electric bulb is controlled is provided with a push button 14. When this is engaged by the door and pushed inwardly the circuit through the light is broken. Hence, if it is desired to use the bulb for heating purposes when the door is closed, breaking of the circuit must be prevented. This is accomplished by providing a fitting in the form of a sleeve 15, see Figs. 2 and 3. This fitting is secured to the inner face of the door in alignment with the push button. The fitting is provided with a cover plate 16 pivoted as at 17. If the cover is swung to the full line position shown in Fig. 3, the button will be engaged during closing of the door and the circuit will be broken. On the other hand, if the cover is swung to the dotted line position shown in Fig. 3 the button will not be engaged during closing of the door and the light will remain burning. Hence, making or breaking of the light circuit is manually controlled and the light may accordingly be used for heating purposes when the door is closed, if that is desired.

In actual operation it will be understood that the container will be made sufficiently large to receive a milk bottle, a square of butter, or whatever article or commodity it is desired to place therein. Practically any temperature may be maintained in this receptacle by adjusting the container with relation to the ceiling; that is, by tightening the nuts 10 and decreasing the space between the ceiling and the upper end of the container the amount of circulating cooled air is reduced and the tendency to cool the contents will be less. By maintaining the bulb in a burning condition, light and heat rays are continuously emitted and the temperature within the container B will obviously be considerably higher than the average or main temperature within the main cooling chamber.

The light 2 may not be in continuous operation. For instance if the housekeeper closes the refrigerator at night she will swing the plate 16 to a position that when the door is closed the push button will be depressed and the light circuit broken, hence during the night the entire contents of the refrigerator and that contained in the container B will assume substantially the same temperature. In the morning when the housekeeper arrives in the kitchen, the first thing she will do is to open the refrigerator door and to swing the cover plate 16 to the dotted line position shown at 17, hence when the door is closed the light circuit will remain on and the contents of the container B will be gradually heated. This may take one-half hour or more and when breakfast is ready the butter and milk may be removed and will be in condition for use.

While the container has been shown as attached to the ceiling and spaced therefrom, it may obviously be attached at any other point and while it has been described as made of glass other materials may obviously be employed. Transparency is not necessary except where lighting of the interior of the container is desired, and while the container has been described particularly for use in connection with milk and butter, it may obviously be used for other purposes, and I similarly wish it understood that various changes may be resorted to within the scope of the appended claims.

Having thus described my invention, what I claim and desire to secure by Letters Patent is:—

1. The combination with a refrigerator having a main cooling chamber and a second chamber formed therein, a heating element in the second chamber, a switch for making or breaking an electric circuit through the heating element, said switch being push button actuated and the circuit through the switch being broken when the button is depressed, and manually controlled means in the door of the refrigerator movable into or out of engagement with the button when the door is closed so that the circuit through the switch may be broken or not at the will of the operator when the door is closed.

2. The combination with a refrigerator having a main cooling chamber, of a container disposed within the main cooling chamber, said container having sides, ends and a bottom section but being open at the top, adjustable means suspending said container from the ceiling of the main cooling chamber, a heating element disposed above the container, a switch for making or breaking an electric circuit through the heating element, and selectively adjustable means on the door of the refrigerator for actuating the switch when the door is closed.

3. The combination with a refrigerator having a main cooling chamber formed therein, a container mounted within said cooling chamber, an electric actuated heating element cooperating with the container, a switch for making or breaking a circuit through the heating element, and selectively adjustable means on the door of the refrigerator for actuating the switch to make or break a circuit through the heating element when the door is closed.

4. The combination with a refrigerator having a main cooling chamber, of a heating element adjacent the ceiling of said chamber, a container suspended from the ceiling below the heating element, said container being open at the top, means for raising or lowering the container with relation to the ceiling and the heating element to increase or decrease the heating of material placed in the container and to vary circulation of air between the container and the cooling chamber, and a switch for making or breaking an electric circuit through the heating element.

5. The combination with a refrigerator having a main cooling chamber, an electric light bulb in the ceiling of the chamber to give light and heat, a transparent container suspended from the ceiling at a point below the light bulb, said container being open at the top, means for raising or lowering the container with relation to the ceiling and the electric bulb to increase or decrease heating of material placed in the container and to vary circulation of air between the container and the cooling chamber, and a switch for making or breaking an electric circuit through the heating element, said switch being selectively operable by closing of the door of the refrigerator.

ARTHUR BRUNNER.